United States Patent
Yuan et al.

(10) Patent No.: US 12,335,186 B2
(45) Date of Patent: Jun. 17, 2025

(54) FLEXIBLE CHANNEL STATE INFORMATION REFERENCE SIGNAL AND SOUNDING REFERENCE SIGNAL ASSOCIATION FOR UPLINK MULTIPLE-INPUT MULTIPLE-OUTPUT

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/758,178

(22) PCT Filed: Jan. 29, 2020

(86) PCT No.: PCT/CN2020/074064
§ 371 (c)(1),
(2) Date: Jun. 29, 2022

(87) PCT Pub. No.: WO2021/151225
PCT Pub. Date: Aug. 5, 2021

(65) Prior Publication Data
US 2023/0031039 A1    Feb. 2, 2023

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0626* (2013.01); *H04W 72/1268* (2013.01); *H04W 72/23* (2023.01)

(58) Field of Classification Search
CPC .......................... H04L 5/0051; H04W 72/23; H04W 72/1268; H04B 7/0626
See application file for complete search history.

(56) References Cited

U.S. PATENT DOCUMENTS

2019/0109679 A1   4/2019  Liu et al.
2022/0166468 A1*  5/2022  Go ....................... H04B 7/0404

FOREIGN PATENT DOCUMENTS

CN      110149187 A    8/2019
CN      110475337 A   11/2019
(Continued)

OTHER PUBLICATIONS

International Search Report and Written Opinion—PCT/CN2020/074064—ISA/EPO—Oct. 27, 2020.
(Continued)

*Primary Examiner* — Alex Skripnikov
(74) *Attorney, Agent, or Firm* — Harrity & Harrity, LLP (57) ABSTRACT

Various aspects of the present disclosure generally relate to wireless communication. In some aspects, a user equipment may determine a set of sounding reference signals (SRSs) based at least in part on a mapping configuration, the mapping configuration being associated with mapping the set of SRSs to a set of channel state information reference signals (CSI-RSs) received by the UE, and the set of CSI-RSs being received based at least in part on a set of reception settings, each associated with a respective CSI-RS of the set of CSI-RSs; determine, based at least in part on the set of reception settings, a set of transmission settings, each corresponding to a respective SRS of the set of SRSs; and transmit the set of SRSs based at least in part on the set of transmission settings. Numerous other aspects are provided.

30 Claims, 6 Drawing Sheets (51) Int. Cl.
*H04W 72/1268* (2023.01)
*H04W 72/23* (2023.01)

(56) References Cited

FOREIGN PATENT DOCUMENTS

| CN | 110710281 A | 1/2020 |
|---|---|---|
| EP | 3567764 A1 | 11/2019 |
| EP | 3780786 A1 | 2/2021 |
| WO | 2018144916 A1 | 8/2018 |
| WO | 2019214611 A1 | 11/2019 |
| WO | 2019215709 A1 | 11/2019 |

OTHER PUBLICATIONS

Oppo: "Remaining Issues on Non-Codebook Based UL Transmission", 3GPP Draft, 3GPP TSG RAN WG1 Meeting #92bis, R1-1803968, Sanya, China, Apr. 16-Apr. 20, 2018, 5 Pages, Section 2.
Nokia., et al., "FR2 BC Enhancements", 3GPP TSG-RAN WG4 Meeting #93, R4-1914275, 3rd Generation Partnership Project (3GPP), Mobile Competence Centre, 650, Route Des Lucioles, F-06921, Sophia-Antipolis Cedex, France, vol. RAN WG4, No. Reno, USA, Nov. 18, 2019-Nov. 22, 2019, Nov. 8, 2019, 11 Pages, XP051818700, Section 3, Figure 2.
Supplementary European Search Report—EP20916831—Search Authority—The Hague—Oct. 10, 2023.

* cited by examiner

FLEXIBLE CHANNEL STATE INFORMATION REFERENCE SIGNAL AND SOUNDING REFERENCE SIGNAL ASSOCIATION FOR UPLINK MULTIPLE-INPUT MULTIPLE-OUTPUT

CROSS-REFERENCE TO RELATED APPLICATION

This application is a 371 national stage of PCT Application No. PCT/CN2020/074064 filed on Jan. 29, 2020, entitled "FLEXIBLE CHANNEL STATE INFORMATION REFERENCE SIGNAL AND SOUNDING REFERENCE SIGNAL ASSOCIATION FOR UPLINK MULTIPLE-INPUT MULTIPLE-OUTPUT," which is hereby expressly incorporated by reference herein.

FIELD OF THE DISCLOSURE

Aspects of the present disclosure generally relate to wireless communication and to techniques and apparatuses for flexible channel state information reference signal (CSI-RS) and sounding reference signal (SRS) association for uplink multiple-input multiple-output (MIMO).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining a set of SRSs based at least in part on a mapping configuration, the mapping configuration being associated with mapping the set of SRSs to a set of CSI-RSs received by the UE, and the set of CSI-RSs being received based at least in part on a set of reception settings, each associated with a respective CSI-RS of the set of CSI-RSs; determining, based at least in part on the set of reception settings, a set of transmission settings, each corresponding to a respective SRS of the set of SRSs; and transmitting the set of SRSs based at least in part on the set of transmission settings.

In some aspects, a UE for wireless communication may include a memory and one or more processors operatively coupled to the memory. The memory and the one or more processors may be configured to determine a set of SRSs based at least in part on a mapping configuration, the mapping configuration being associated with mapping the set of SRSs to a set of CSI-RSs received by the UE, and the set of CSI-RSs being received based at least in part on a set of reception settings, each associated with a respective CSI-RS of the set of CSI-RSs; determine, based at least in part on the set of reception settings, a set of transmission settings, each corresponding to a respective SRS of the set of SRSs; and transmit the set of SRSs based at least in part on the set of transmission settings.

In some aspects, a non-transitory computer-readable medium may store one or more instructions for wireless communication. The one or more instructions, when executed by one or more processors of a UE, may cause the one or more processors to determine a set of SRSs based at least in part on a mapping configuration, the mapping configuration being associated with mapping the set of SRSs to a set of CSI-RSs received by the UE, and the set of CSI-RSs being received based at least in part on a set of reception settings, each associated with a respective CSI-RS of the set of CSI-RSs; determine, based at least in part on the set of reception settings, a set of transmission settings, each corresponding to a respective SRS of the set of SRSs; and transmit the set of SRSs based at least in part on the set of transmission settings.

In some aspects, an apparatus for wireless communication may include means for determining a set of SRSs based at least in part on a mapping configuration, the mapping configuration being associated with mapping the set of SRSs to a set of CSI-RSs received by the apparatus, and the set of CSI-RSs being received based at least in part on a set of reception settings, each associated with a respective CSI-RS of the set of CSI-RSs; means for determining, based at least in part on the set of reception settings, a set of transmission settings, each corresponding to a respective SRS of the set of SRSs; and means for transmitting the set of SRSs based at least in part on the set of transmission settings.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
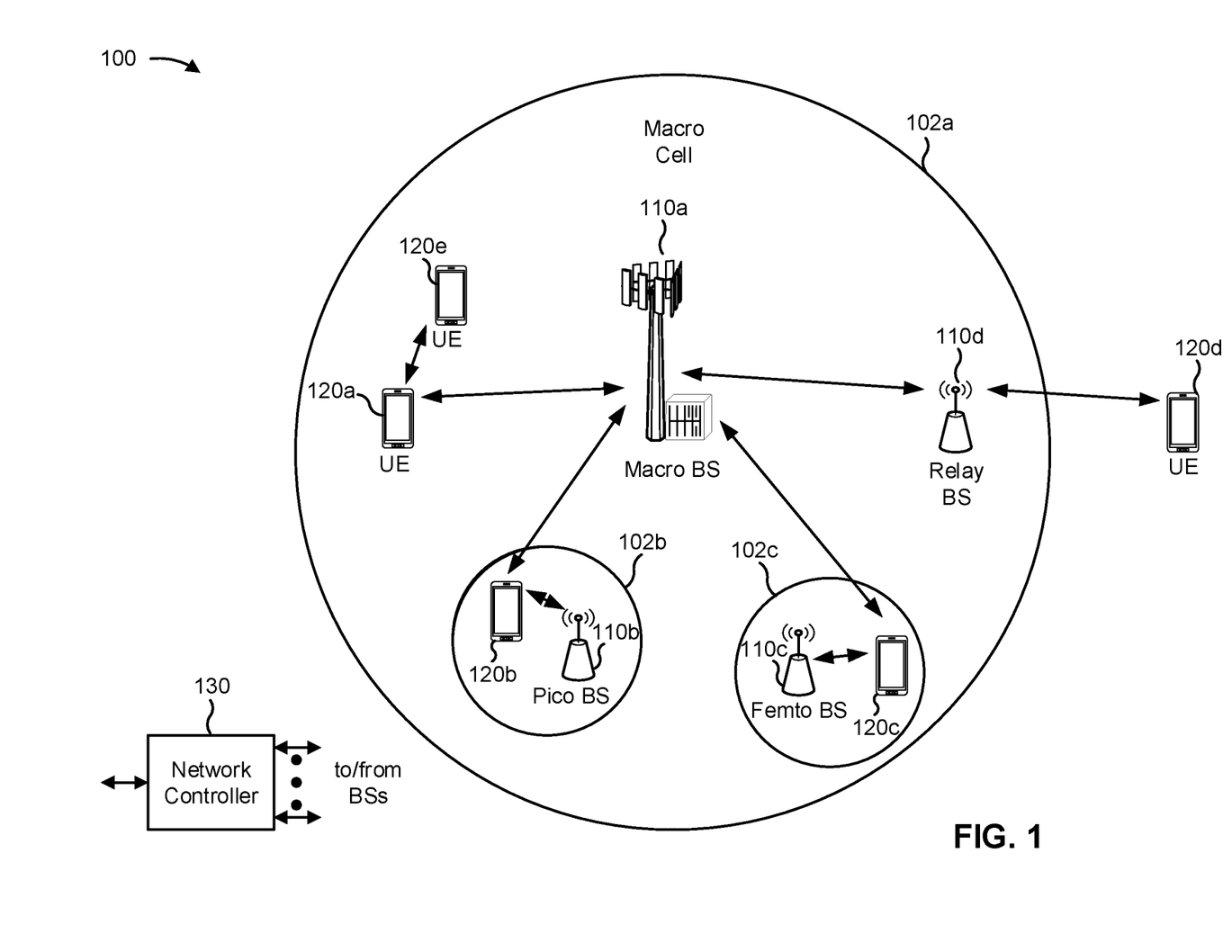
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable wireless transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
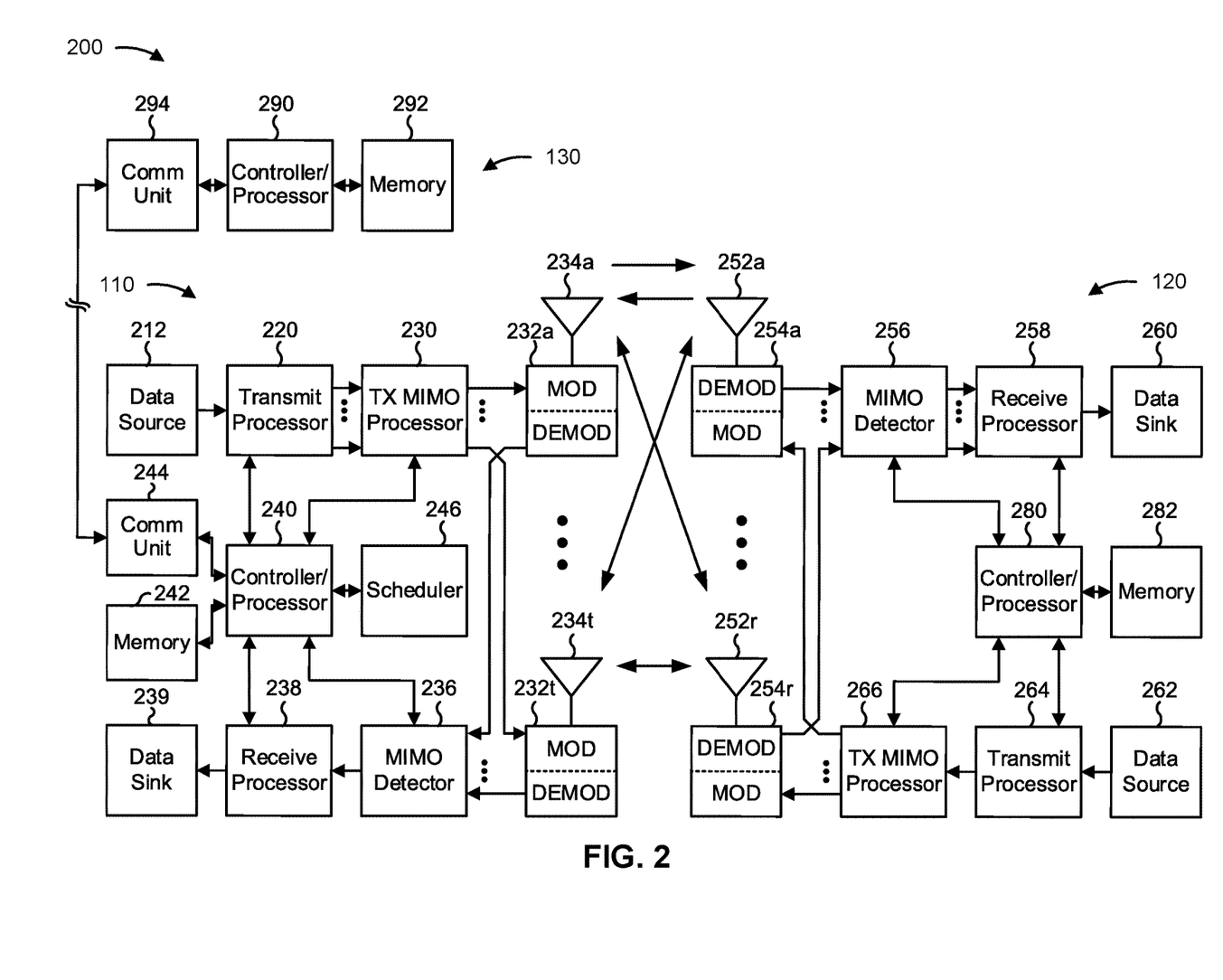
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with flexible CSI-RS and SRS association for uplink MIMO, as described in more detail elsewhere herein. For example, controller/processor 240 of base station 110, controller/processor 280 of UE 120, and/or any other component(s) of FIG. 2 may perform or direct operations of, for example, process 400 of FIG. 4, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, and/or other processes as described herein. A scheduler 246 may schedule UEs for data transmission on the downlink and/or uplink.

In some aspects, UE 120 may include means for determining a set of SRSs based at least in part on a mapping configuration, the mapping configuration being associated with mapping the set of SRSs to a set of CSI-RSs received by the UE, and the set of CSI-RSs being received based at least in part on a set of reception settings, each associated with a respective CSI-RS of the set of CSI-RSs; means for determining, based at least in part on the set of reception settings, a set of transmission settings, each corresponding to a respective SRS of the set of SRSs; means for transmitting the set of SRSs based at least in part on the set of transmission settings; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a wireless communication system, such as an NR system, a spatial relation between a reference signal and an SRS can be configured (e.g., when a spatialRelationInfo parameter, associated with the SRS, contains an identifier associated with the reference signal). The reference signal may be, for example, a CSI-RS configured on a same serving cell (e.g., indicated by a servingCellId parameter) as that associated with the SRS. According to current standards, for a UE configured with one or more SRS resource configurations, and when a resourceType parameter in SRS-Resource is set to 'periodic', the UE can be configured with the spatialRelationInfo parameter containing an identifier of a reference 'CSI-RS-Index.' In such a case, the UE should transmit the SRS using a same spatial filter (i.e., spatial domain transmission filter) as that used for reception of the associated CSI-RS. Here, since such a configuration means that an SRS (e.g., an SRS with multiple ports) should be transmitted with the same spatial filter as that associated with receiving the CSI-RS, only single beam operation is supported on the uplink.

However, support for multiple beams in a case in which an SRS is associated with a CSI-RS may be useful in a number of scenarios, such as a partial channel reciprocity scenario. Partial channel reciprocity may be present, for example, when downlink transmissions and uplink transmissions are in different component carriers (e.g., in a carrier aggregation scenario), when downlink transmissions and uplink transmissions are in different bandwidth parts, when full beam correspondence is not present (e.g., where partial beam correspondence results in performance loss, and SRS beam sweeping may be used to improve partial beam correspondence), or when asymmetric downlink and uplink interference is present (e.g., where uplink interference mitigation can be improved by uplink precoder and/or beam selection).

Some aspects described herein provide techniques and apparatuses for flexible CSI-RS and SRS association for uplink MIMO. In some aspects, a UE may determine a set of SRSs based at least in part on a mapping configuration, associated with mapping the set of SRSs to a set of CSI-RSs, where the set of CSI-RSs is received by the UE based at least in part on a set of reception settings. In some aspects, the UE may determine, based at least in part on the set of reception settings, a set of transmission settings for the set of SRSs, and may transmit the set of SRSs based at least in part on the set of transmission settings. Additional details are described below. In some aspects, the techniques and apparatuses described herein enable support for multiple beams on the uplink in a case in which an SRS is associated with a CSI-RS, which may be advantageous in, for example, a partial channel reciprocity scenario, as described above.

Figure 3A:
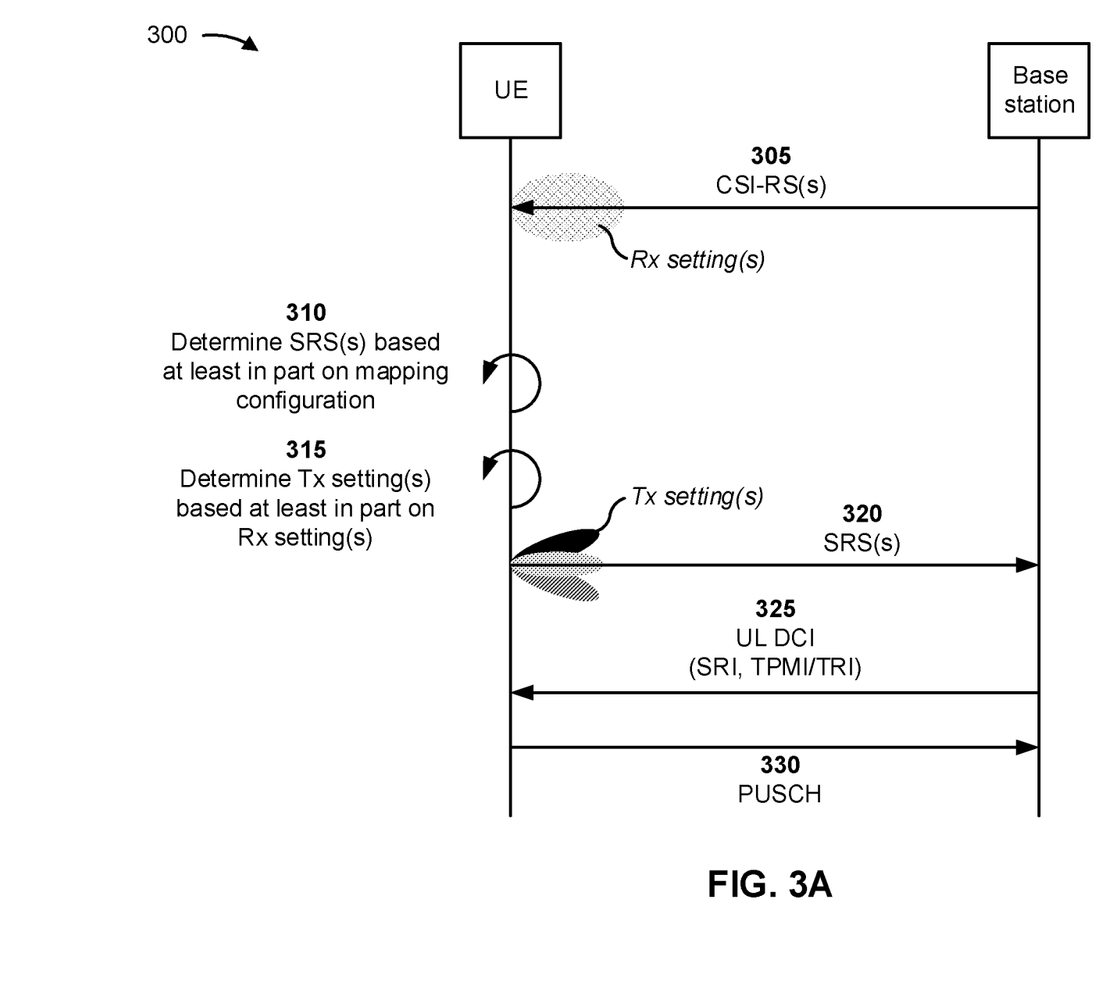
FIGS. 3A-3C are diagrams illustrating examples associated with flexible CSI-RS and SRS association for uplink MIMO, in accordance with various aspects of the present disclosure.
Figure 3B:
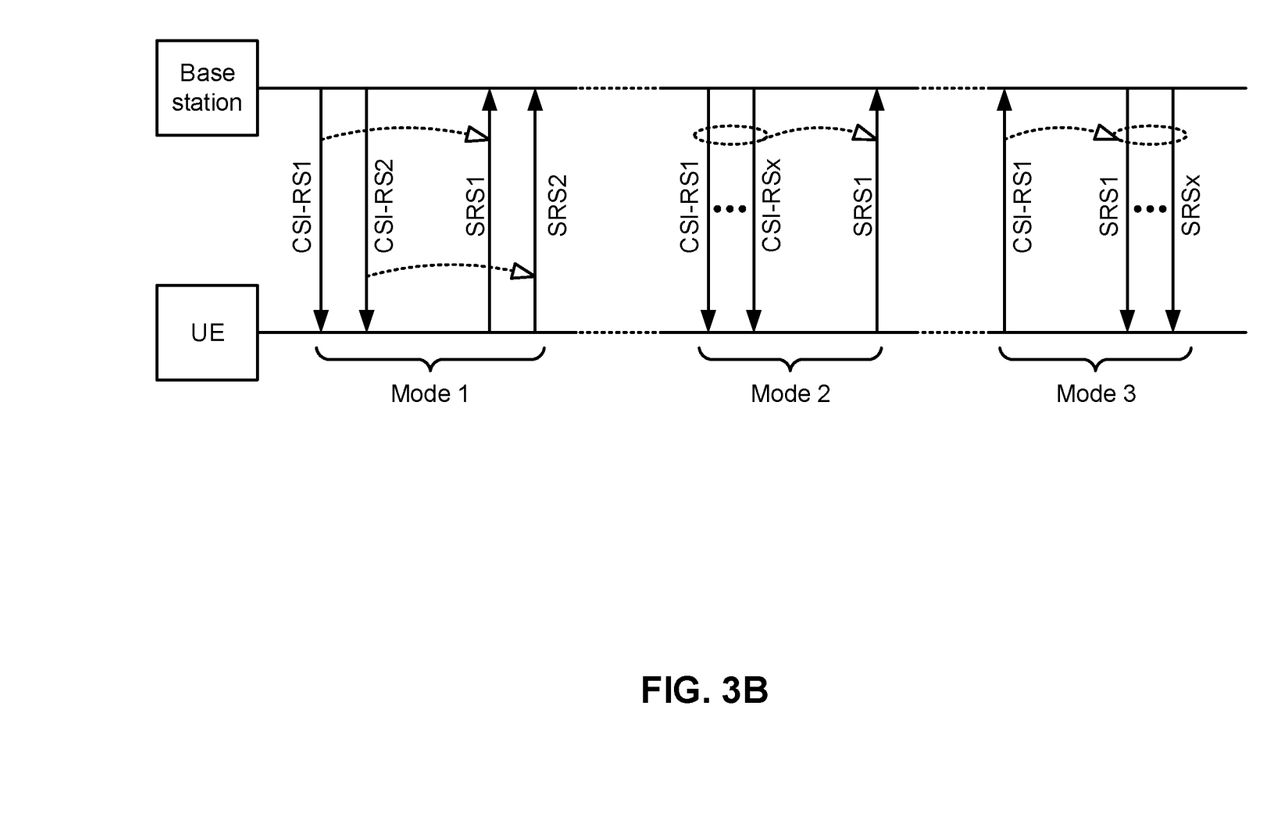
Figure 3C:
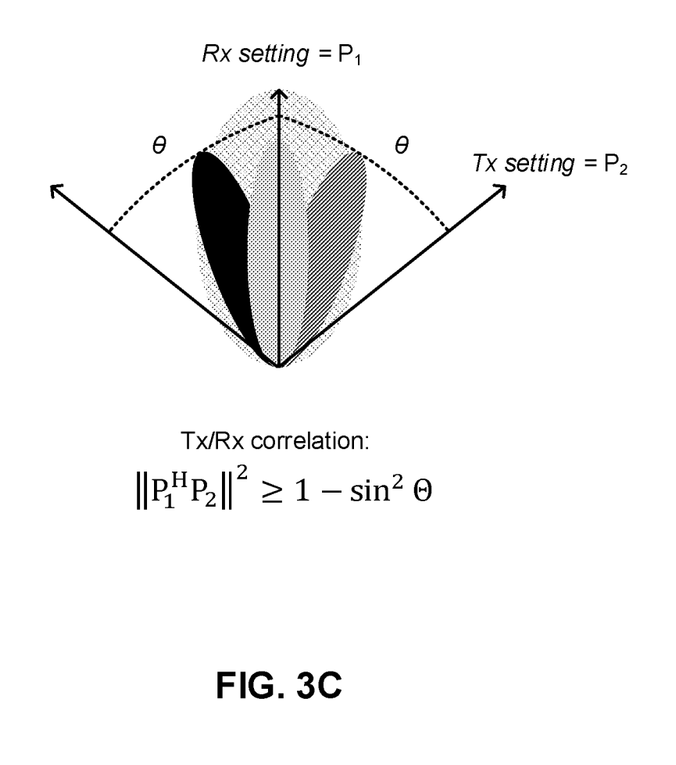

FIGS. 3A-3C are diagrams illustrating examples associated with flexible CSI-RS and SRS association for uplink MIMO, in accordance with various aspects of the present disclosure. In FIG. 3A, for uplink MIMO transmission, a UE (e.g., UE 120) is configured for codebook-based PUSCH transmissions, and usage of a set of SRSs is configured as codebook-based, and is associated with a set of CSI-RSs, as described above.

As shown in FIG. 3A, and by reference 305, the UE may receive the set of CSI-RSs based at least in part on the set of CSI-RSs being transmitted by a base station (e.g., base station 110). In some aspects, the UE may receive the set of CSI-RSs based at least in part on a set of reception settings, each associated with a respective CSI-RS of the set of CSI-RSs. For example, the UE may receive a first CSI-RS of the set of CSI-RSs based at least in part on a first reception setting, may receive a second CSI-RS of the set of CSI-RSs based at least in part on a second reception setting, and so on. In some aspects, a given reception setting, associated with a given CSI-RS, may include information that defines a spatial filter used to receive the given, CSI-RS, a beam used to receive the given CSI-RS, a precoder associated with the given CSI-RS, and/or the like.

As shown by reference 310, the UE may determine the set of SRSs associated with the set of CSI-RSs. In some aspects, the UE may determine the set of SRSs based at least in part on a mapping configuration associated with mapping the sets of SRS to the set of CSI-RSs.

In some aspects, the mapping configuration may indicate that a single SRS of the set of SRSs is to be mapped to a single CSI-RS of the set of CSI-RSs. That is, in some aspects, the mapping can indicate X (X>1) instances of 1:1 mapping such that each SRS of the set of SRSs is mapped to a respective CSI-RS of the set of CSI-RSs. An example of such a mapping configuration is shown in the portion of FIG. 3B identified as "Mode 1." In the Mode 1 example in FIG. 3B, SRS1 is mapped to CSI-RS1, and SRS2 is mapped to CSI-RS2. In some aspects, when such a mapping configuration is used, the set of CSI-RSs may be configured with the set parameter "repetition=off," which means different transmit spatial filters at the base station can be used for transmitting different CSI-RSs in the set.

As another example, the mapping configuration may indicate that a single SRS of the set of SRSs is to be mapped to at least two CSI-RSs of the set of CSI-RSs. That is, in some aspects, the mapping can indicate X:1 mapping such that a given SRS of the set of SRSs is mapped to multiple CSI-RSs of the set of CSI-RSs. An example of such a mapping configuration is shown in the portion of FIG. 3B identified as "Mode 2." In the Mode 2 example in FIG. 3B, SRS1 is mapped to CSI-RS1 through CSI-RSX. In some aspects, when such a mapping configuration is used, the set of CSI-RSs may be configured with the set parameter "repetition=on," which means the same transmit spatial filter at the base station is to be used for transmitting all the CSI-RSs in the set.

As another example, the mapping configuration may indicate that at least two SRSs of the set of SRSs is to be mapped to a single CSI-RS of the set of CSI-RSs. That is, in some aspects, the mapping can indicate 1:X mapping such that multiple SRSs are associated with a given CSI-RS. An example of such a mapping configuration is shown in the portion of FIG. 3B identified as "Mode 3." In the Mode 3 example in FIG. 3B, SRS1 through SRSX are mapped to CSI-RS1.

In some aspects, the UE may receive the mapping configuration via, for example, radio resource control (RRC) signaling. In some aspects, the mapping configuration may be based at least in part on one or more UE capabilities (e.g., a capability associated with determination of transmission settings by the UE).

Referring again to FIG. 3A, as shown by reference 315, the UE may determine a set of transmission settings, each corresponding to a respective SRS of the set of SRSs. In some aspects, the UE may determine the set of transmission settings based at least in part on the set of reception settings associated with receiving the set of CSI-RSs. For example, the UE may measure the set of CSI-RSs and, in accordance with the mapping configuration, may determine the set of transmission settings for the set of SRSs based at least in part on the set of reception settings and the measurements associated with the set of CSI-RSs. In some aspects, a transmission setting for a given SRS of the set of SRSs may include information associated with a spatial filter associated with the given SRS, a beam associated with the given SRS, or a precoder associated with the given SRS, and/or the like.

In some aspects, one or more SRSs of the set of SRSs may have multiple ports, and each port may be associated with a different transmission setting. In some aspects, the use of multiple ports with different transmission settings may enable an uplink rank to be determined based at least in part on different transmission settings at each transmission of the same SRS from UE.

In some aspects, a transmission setting for an SRS of the set of SRSs may be different from a reception setting for a CSI-RS, of the set of CSI-RSs, that is associated with the SRS. That is, while the transmission setting of the SRS may be based at least in part on the reception setting of the associated CSI-RS, the transmission setting of the SRS may be different from the reception setting of the associated CSI-RS.

In some aspects, a difference between the transmission setting of a given SRS and the reception setting of an associated CSI-RS may be controlled by a configuration received via, for example, RRC signaling.

In some aspects, a difference between the transmission setting of a given SRS and the reception setting of an associated SRS may be controlled based at least in part on a threshold (e.g., an RRC configured threshold, a threshold associated with a measurement of beam correspondence, a threshold associated with precoder correlation, and/or the like).

FIG. 3C illustrates an example associated with controlling a difference between a transmission setting and a reception setting. In FIG. 3C, the transmission setting is restricted to being correlated with the reception setting by a correlation threshold (e.g., an RRC configured correlation threshold). In this example, the required correlation is defined by the following formula:

$$\|P_1^H P_2\|^2 \leq 1 - \sin^2 \Theta$$

where $P_1$ is the reception setting, $P_2$ is the transmission setting, and $\Theta$ is a difference in beam direction (e.g., an angle) between a beam associated with the reception setting and a beam associated with the transmission setting. Here, the transmission setting should be selected such that the condition defined by the formula is satisfied. Notably, the above formula is provided merely as an example, and other examples are possible.

In some aspects, controlling a difference between a transmission setting of a given SRS and a reception setting of an associated CSI-RS may enable improved power control (e.g., power fluctuation can be controlled by restricting correlation) and/or improved interference management (e.g., since interference may be caused/uncontrolled if the UE were permitted to change the transmission setting arbitrarily).

Referring again to FIG. 3A, and as shown by reference 320, the UE may transmit the set of SRSs based at least in part on the set of transmission settings.

As shown by reference 325, the UE may, after transmitting the set of SRSs, receive uplink downlink control information (DCI) that schedules an uplink transmission (e.g., a physical uplink shared channel (PUSCH) transmission). For example, after transmitting the set of CSI-RSs, the base station may receive the set of SRSs transmitted by the UE. The base station may measure the set of SRSs and, based on the measurements, may identify an SRS that used a transmission setting suitable for the uplink transmission. The base station may then provide uplink DCI that indicates the selected transmission setting (and therefore the selected SRS) and schedules the uplink transmission.

In some aspects, the uplink DCI may include information indicating a transmission setting, of the set of transmission settings, selected for the uplink transmission, as described above. In some aspects, the information that indicates the transmission setting selected for the PUSCH transmission may be an SRS resource indicator (SRI), an uplink transmission configuration indicator (TCI), or another type of indicator carried in the uplink DCI. In some aspects, the uplink DCI may further indicate a preferred precoder for the uplink transmission and a number of layers for the uplink transmission (TPMI/TRI), and/or another type of information.

In some aspects, as shown by reference 330, the UE may transmit the PUSCH transmission based at least in part on receiving the uplink DCI that schedules the PUSCH transmission. For example, the UE may identify, based at least in part on the uplink DCI, the transmission setting selected for the PUSCH transmission as described above, and may transmit the PUSCH transmission using the selected transmission setting.

As indicated above, FIGS. 3A-3C are provided as examples. Other examples may differ from what is described with respect to FIGS. 3A-3C.

Figure 4:
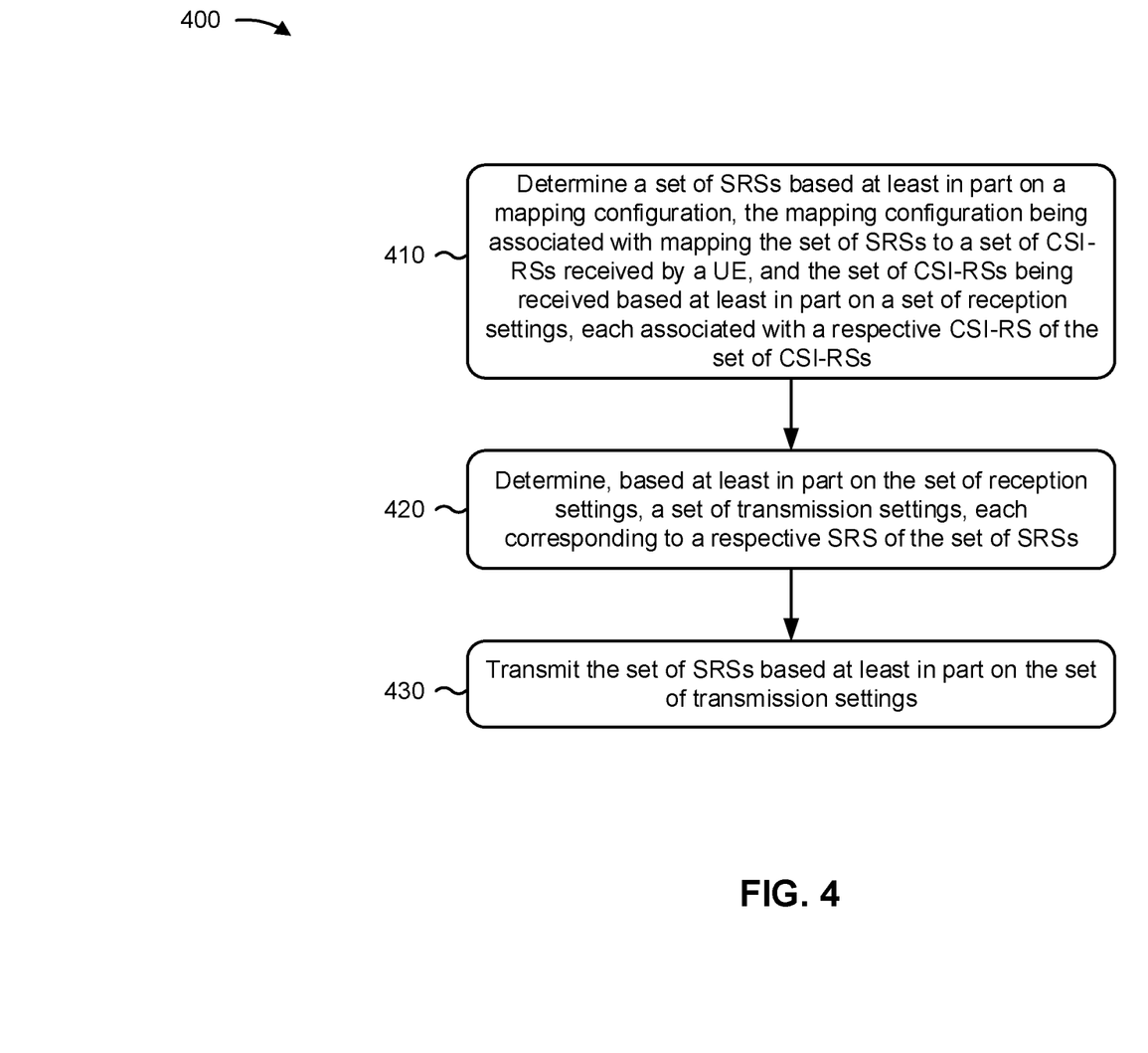
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with flexible CSI-RS and SRS association for uplink MIMO.

As shown in FIG. 4, in some aspects, process 400 may include determining a set of SRSs based at least in part on a mapping configuration, the mapping configuration being associated with mapping the set of SRSs to a set of CSI-RSs received by the UE, and the set of CSI-RSs being received based at least in part on a set of reception settings, each associated with a respective CSI-RS of the set of CSI-RSs (block 410). For example, the UE (e.g., using receive processor 258, transmit processor 264, controller/processor 280, memory 282, and/or the like) may determine a set of SRSs based at least in part on a mapping configuration, as described above. In some aspects, the mapping configuration is associated with mapping the set of SRSs to a set of CSI-RSs received by the UE. In some aspects, the set of CSI-RSs is received based at least in part on a set of reception settings, each associated with a respective CSI-RS of the set of CSI-RSs As further shown in FIG. 4, in some aspects, process 400 may include determining, based at least in part on the set of reception settings, a set of transmission settings, each corresponding to a respective SRS of the set of SRSs (block 420). For example, the UE (e.g., using receive processor 258, transmit processor 264, controller/processor 280, memory 282, and/or the like) may determine, based at least in part on the set of reception settings, a set of transmission settings, each corresponding to a respective SRS of the set of SRSs, as described above.

As further shown in FIG. 4, in some aspects, process 400 may include transmitting the set of SRSs based at least in part on the set of transmission settings (block 430). For example, the UE (e.g., using receive processor 258, transmit processor 264, controller/processor 280, memory 282, and/or the like) may transmit the set of SRSs based at least in part on the set of transmission settings, as described above.

Process 400 may include additional aspects, such as any single aspect or any combination of aspects described below and/or in connection with one or more other processes described elsewhere herein.

In a first aspect, the mapping configuration indicates that a single SRS of the set of SRSs is to be mapped to a single CSI-RS of the set of CSI-RSs.

In a second aspect, alone or in combination with the first aspect, the set of CSI-RSs is configured with repetition off.

In a third aspect, alone or in combination with one or more of the first and second aspects, the mapping configuration indicates that a single SRS of the set of SRSs is to be mapped to at least two CSI-RSs of the set of CSI-RSs.

In a fourth aspect, alone or in combination with one or more of the first through third aspects, the set of CSI-RSs is configured with repetition on.

In a fifth aspect, alone or in combination with one or more of the first through fourth aspects, the mapping configuration indicates that at least two SRSs of the set of SRSs is to be mapped to a single CSI-RS of the set of CSI-RSs.

In a sixth aspect, alone or in combination with one or more of the first through fifth aspects, the mapping configuration is received via radio resource control signaling.

In a seventh aspect, alone or in combination with one or more of the first through sixth aspects, the mapping configuration is based at least in part on one or more UE capabilities.

In an eighth aspect, alone or in combination with one or more of the first through seventh aspects, a transmission setting for a given SRS of the set of SRSs includes information associated with at least one of a spatial filter associated with the given SRS, a beam associated with the given SRS, or a precoder associated with the given SRS.

In a ninth aspect, alone or in combination with one or more of the first through eighth aspects, a transmission setting for an SRS, of the set of SRSs, is different from a reception setting for a CSI-RS, of the set of CSI-RSs, that is associated with the SRS.

In a tenth aspect, alone or in combination with one or more of the first through ninth aspects, a difference between the transmission setting and the reception setting is controlled by a configuration of radio resource control signaling.

In an eleventh aspect, alone or in combination with one or more of the first through tenth aspects, a difference between the transmission setting and the reception setting is controlled based at least in part on a threshold.

In a twelfth aspect, alone or in combination with one or more of the first through eleventh aspects, the threshold is associated with a measurement of beam correspondence or a precoder correlation.

In a thirteenth aspect, alone or in combination with one or more of the first through twelfth aspects, at least one SRS, of the set of SRSs, has multiple ports, each port being associated with a different transmission setting.

In a fourteenth aspect, alone or in combination with one or more of the first through thirteenth aspects, process 400 includes receiving uplink DCI after transmitting the set of SRSs, the uplink DCI scheduling a PUSCH transmission and including information indicating a transmission setting, of the set of transmission settings, selected for the PUSCH transmission; a preferred precoder for the PUSCH transmission; and a number of layers for the PUSCH transmission.

In a fifteenth aspect, alone or in combination with one or more of the first through fourteenth aspects, the information indicating the transmission setting selected for the PUSCH transmission includes at least one of an SRS resource indicator or an uplink transmission configuration indicator.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a set of sounding reference signals (SRSs) based at least in part on a mapping configuration,
   the mapping configuration being associated with mapping the set of SRSs to a set of channel state information reference signals (CSI-RSs) received by the UE, and
   the set of CSI-RSs being received based at least in part on a set of reception settings, each associated with a respective CSI-RS of the set of CSI-RSs;
   determining, based at least in part on the set of reception settings, a set of transmission settings, each corresponding to a respective SRS of the set of SRSs; and
   transmitting the set of SRSs based at least in part on the set of transmission settings;
   wherein a transmission setting for an SRS, of the set of SRSs, is different from a reception setting for a CSI-RS, of the set of CSI-RSs, that is associated with the SRS.

2. The method of claim 1, wherein the mapping configuration indicates that a single SRS of the set of SRSs is to be mapped to a single CSI-RS of the set of CSI-RSs.

3. The method of claim 2, wherein the set of CSI-RSs is configured with repetition off.

4. The method of claim 1, wherein the mapping configuration indicates that a single SRS of the set of SRSs is to be mapped to at least two CSI-RSs of the set of CSI-RSs.

5. The method of claim 4, wherein the set of CSI-RSs is configured with repetition on.

6. The method of claim 1, wherein the mapping configuration indicates that at least two SRSs of the set of SRSs is to be mapped to a single CSI-RS of the set of CSI-RSs.

7. The method of claim 1, wherein the mapping configuration is received via radio resource control signaling.

8. The method of claim 1, wherein the mapping configuration is based at least in part on one or more UE capabilities.

9. The method of claim 1, wherein a transmission setting for a given SRS of the set of SRSs includes information associated with at least one of:
   a spatial filter associated with the given SRS,
   a beam associated with the given SRS, or
   a precoder associated with the given SRS.

10. The method of claim 1, wherein a difference between the transmission setting and the reception setting is controlled by a configuration of radio resource control signaling.

11. The method of claim 1, wherein a difference between the transmission setting and the reception setting is controlled based at least in part on a threshold.

12. The method of claim 11, wherein the threshold is associated with a measurement of beam correspondence or a precoder correlation.

13. The method of claim 1, wherein at least one SRS, of the set of SRSs, has multiple ports, each port being associated with a different transmission setting.

14. The method of claim 1, further comprising:
receiving uplink downlink control information (DCI) after transmitting the set of SRSs, the uplink DCI scheduling a physical uplink shared channel (PUSCH) transmission and including:
information indicating a transmission setting, of the set of transmission settings, selected for the PUSCH transmission,
a preferred precoder for the PUSCH transmission, and
a number of layers for the PUSCH transmission.

15. The method of claim 14, wherein the information indicating the transmission setting selected for the PUSCH transmission includes at least one of:
an SRS resource indicator, or
an uplink transmission configuration indicator.

16. A user equipment (UE) for wireless communication, comprising:
a memory; and
one or more processors operatively coupled to the memory, the memory and the one or more processors configured to:
determine a set of sounding reference signals (SRSs) based at least in part on a mapping configuration,
the mapping configuration being associated with mapping the set of SRSs to a set of channel state information reference signals (CSI-RSs) received by the UE, and
the set of CSI-RSs being received based at least in part on a set of reception settings, each associated with a respective CSI-RS of the set of CSI-RSs;
determine, based at least in part on the set of reception settings, a set of transmission settings, each corresponding to a respective SRS of the set of SRSs; and
transmit the set of SRSs based at least in part on the set of transmission settings;
wherein a transmission setting for an SRS, of the set of SRSs, is different from a reception setting for a CSI-RS, of the set of CSI-RSs, that is associated with the SRS.

17. The UE of claim 16, wherein the mapping configuration indicates that a single SRS of the set of SRSs is to be mapped to a single CSI-RS of the set of CSI-RSs.

18. The UE of claim 17, wherein the set of CSI-RSs is configured with repetition off.

19. The UE of claim 16, wherein the mapping configuration indicates that a single SRS of the set of SRSs is to be mapped to at least two CSI-RSs of the set of CSI-RSs.

20. The UE of claim 19, wherein the set of CSI-RSs is configured with repetition on.

21. The UE of claim 16, wherein the mapping configuration indicates that at least two SRSs of the set of SRSs are to be mapped to a single CSI-RS of the set of CSI-RSs.

22. The UE of claim 16, wherein a transmission setting for a given SRS of the set of SRSs includes information associated with at least one of:
a spatial filter associated with the given SRS,
a beam associated with the given SRS, or
a precoder associated with the given SRS.

23. The UE of claim 16, wherein a difference between the transmission setting and the reception setting is controlled by a configuration of radio resource control signaling.

24. The UE of claim 16, wherein at least one SRS, of the set of SRSs, has multiple ports, each port being associated with a different transmission setting.

25. The UE of claim 16, wherein the one or more processors are further configured to:
receive uplink downlink control information (DCI) after transmitting the set of SRSs, the uplink DCI scheduling a physical uplink shared channel (PUSCH) transmission and including:
information indicating a transmission setting, of the set of transmission settings, selected for the PUSCH transmission,
a preferred precoder for the PUSCH transmission, and
a number of layers for the PUSCH transmission.

26. The UE of claim 16, wherein the mapping configuration is received via radio resource control signaling.

27. The UE of claim 16, wherein the mapping configuration is based at least in part on one or more UE capabilities.

28. The UE of claim 16, wherein a difference between the transmission setting and the reception setting is controlled based at least in part on a threshold.

29. The UE of claim 28, wherein the threshold is associated with a measurement of beam correspondence or a precoder correlation.

30. An apparatus for wireless communication, comprising:
means for determining a set of sounding reference signals (SRSs) based at least in part on a mapping configuration,
the mapping configuration being associated with mapping the set of SRSs to a set of channel state information reference signals (CSI-RSs) received by the apparatus, and
the set of CSI-RSs being received based at least in part on a set of reception settings, each associated with a respective CSI-RS of the set of CSI-RSs;
means for determining, based at least in part on the set of reception settings, a set of transmission settings, each corresponding to a respective SRS of the set of SRSs; and
means for transmitting the set of SRSs based at least in part on the set of transmission settings;
wherein a transmission setting for an SRS, of the set of SRSs, is different from a reception setting for a CSI-RS, of the set of CSI-RSs, that is associated with the SRS.

* * * * *